United States Patent [19]

Akins

[11] 4,454,926

[45] Jun. 19, 1984

[54] AIR INTAKE ON A TRACTOR ENGINE HOOD

[75] Inventor: Herbert G. Akins, Downers Grove, Ill.

[73] Assignee: International Harvester Co., Chicago, Ill.

[21] Appl. No.: 381,140

[22] Filed: May 24, 1982

Related U.S. Application Data

[63] Continuation-in-part of Ser. No. 355,797, Mar. 8, 1982, abandoned, which is a continuation of Ser. No. 136,869, Apr. 2, 1980, abandoned.

[51] Int. Cl.³ .............................................. B60K 11/06
[52] U.S. Cl. .................................. 180/68.1; 123/41.7; 180/68.3; 180/69.24
[58] Field of Search .................. 180/54 A, 89.2, 69 R, 180/69 C, 69.01, 89.17, 68 R, 296, 68.1, 68.3, 69.24; 181/204, 205, 224, 225; 123/41.7

[56] References Cited

U.S. PATENT DOCUMENTS

| | | | |
|---|---|---|---|
| 2,871,968 | 2/1959 | Giacosa | 180/54 A |
| 3,043,390 | 7/1962 | Lattay | 180/54 A |
| 3,866,580 | 2/1975 | Whitehurst et al. | 180/54 A |
| 3,946,824 | 3/1976 | Jester et al. | 180/54 A X |
| 4,086,976 | 5/1978 | Holm et al. | 180/54 A |
| 4,114,714 | 9/1978 | Fachbach et al. | 180/54 A |
| 4,339,014 | 7/1982 | Berth et al. | 180/68 R |
| 4,371,047 | 2/1983 | Hale et al. | 180/54 A |

Primary Examiner—Robert J. Spar
Assistant Examiner—Donald W. Underwood
Attorney, Agent, or Firm—Boris Parad; Ernest E. Helms; F. David Au Buchon

[57] ABSTRACT

A tractor vehicle (10) is provided with a heat exchanger (64) compartment supplied with ambient air from an intake grille (24) above the heat exchanger compartment. The intake grille (24) covers a top air intake port for supplying air to a heat exchanger (64). Ambient air is drawn through the intake grille (24) and through the heat exchanger (64) by a fan (50) which discharges through a front grille (40).

5 Claims, 11 Drawing Figures

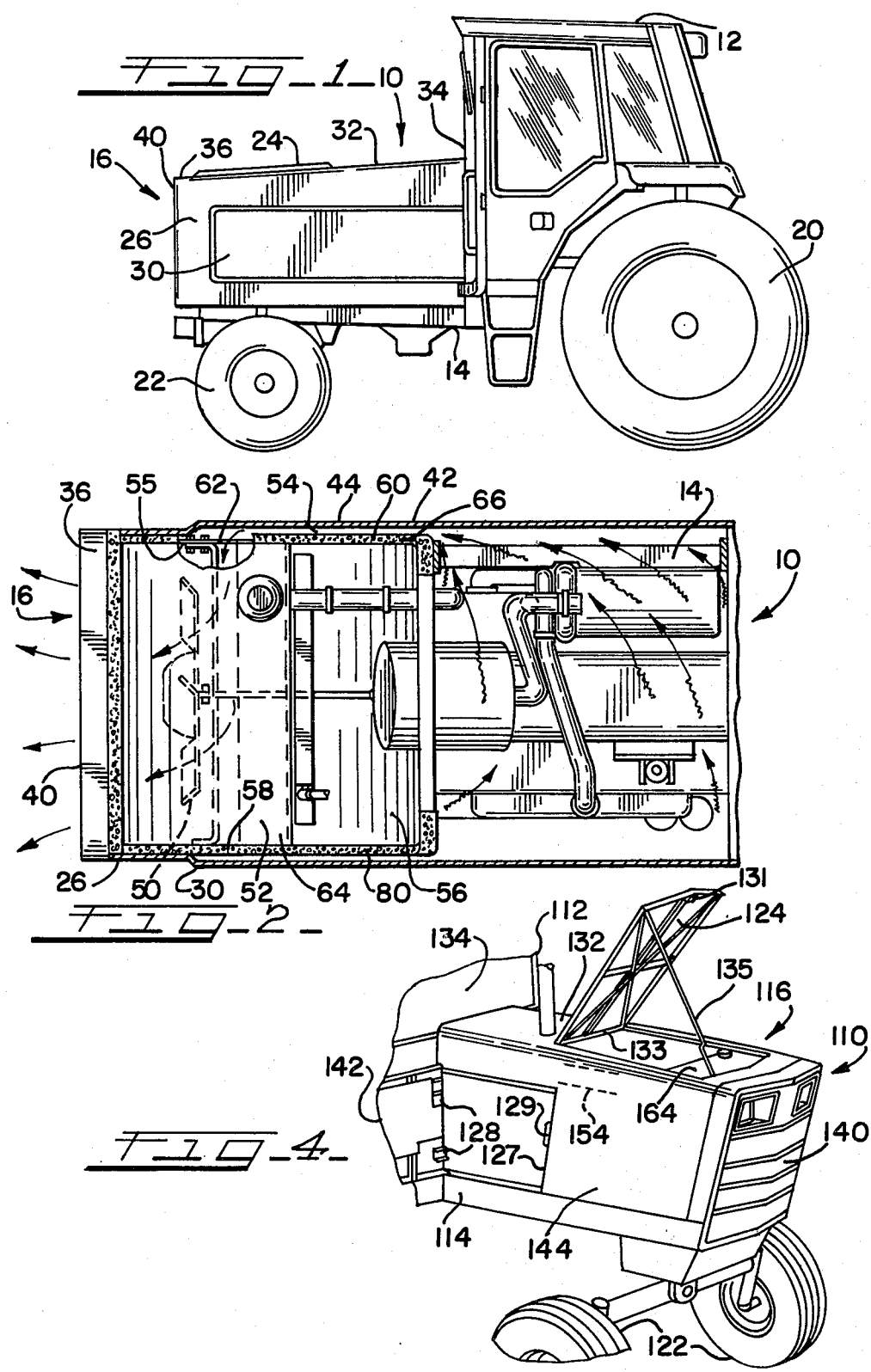

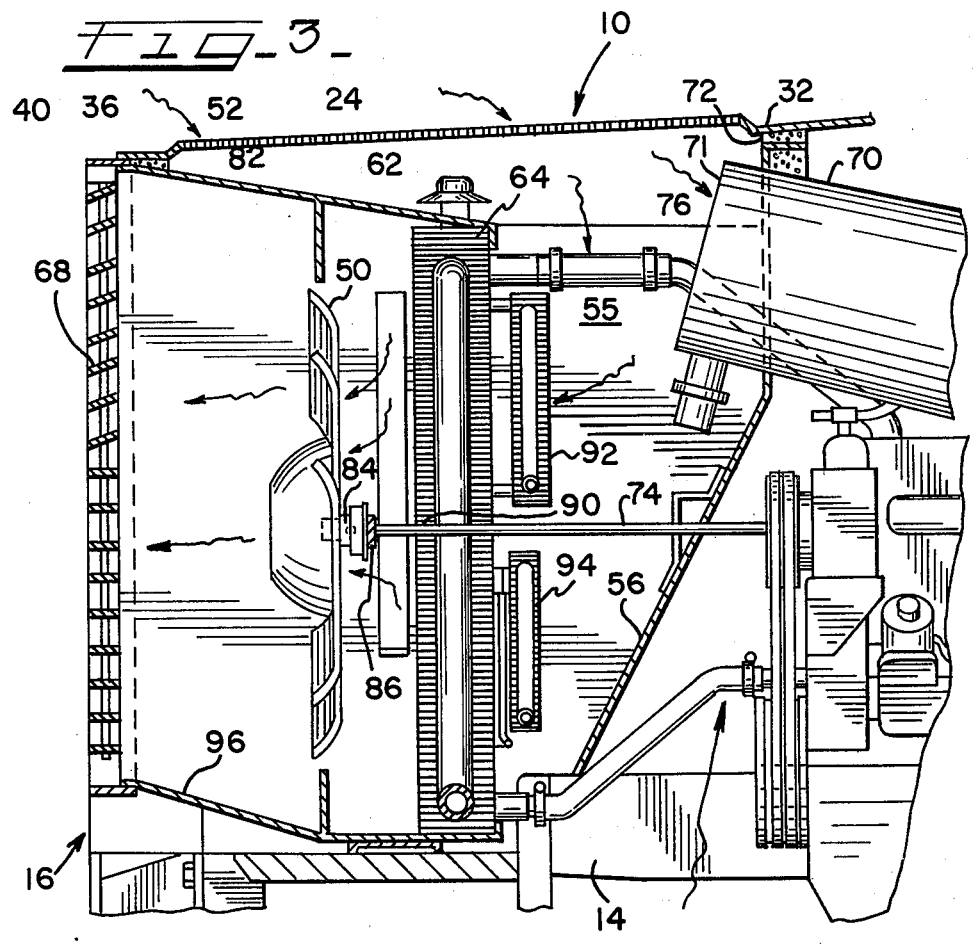

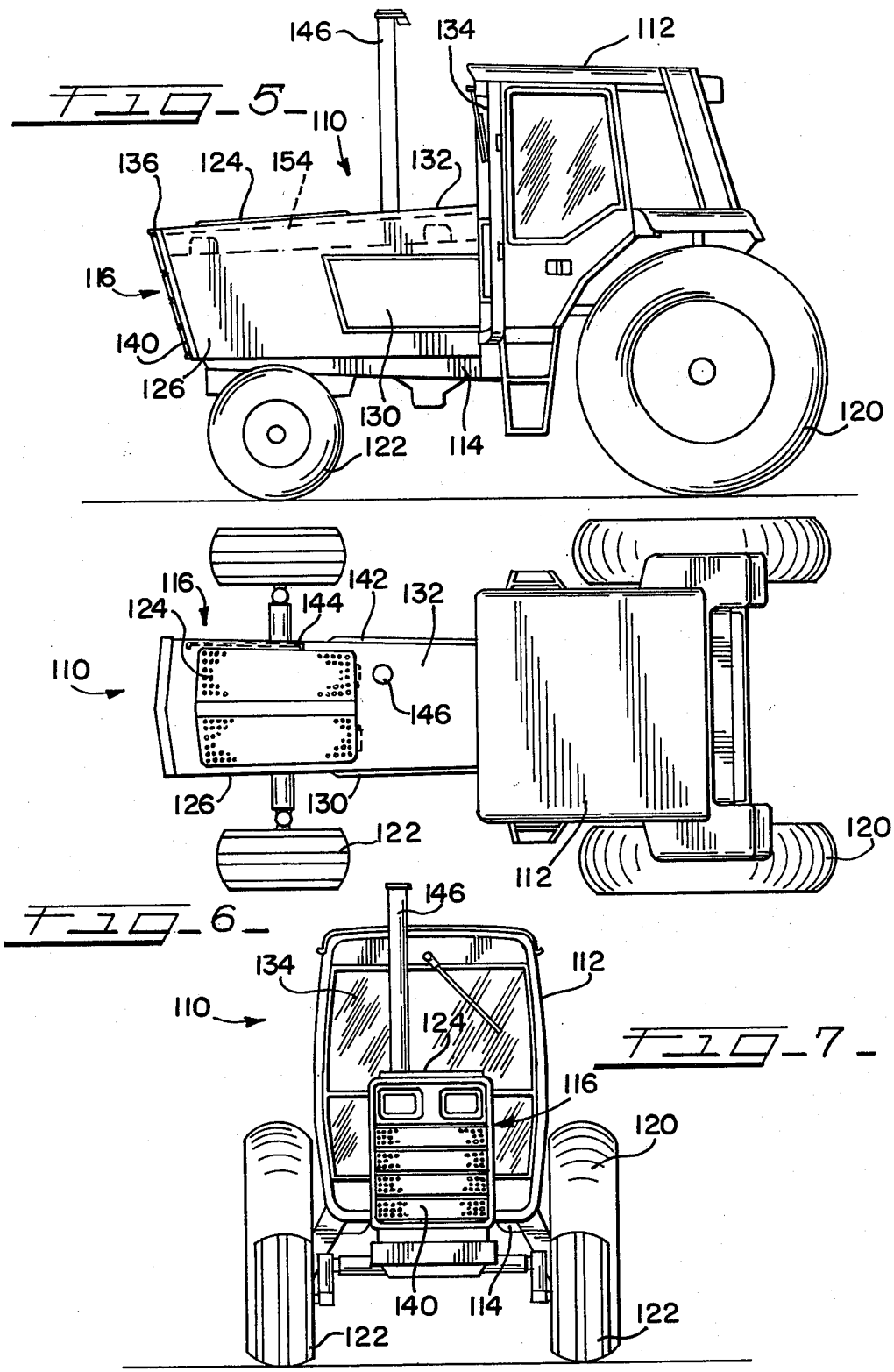

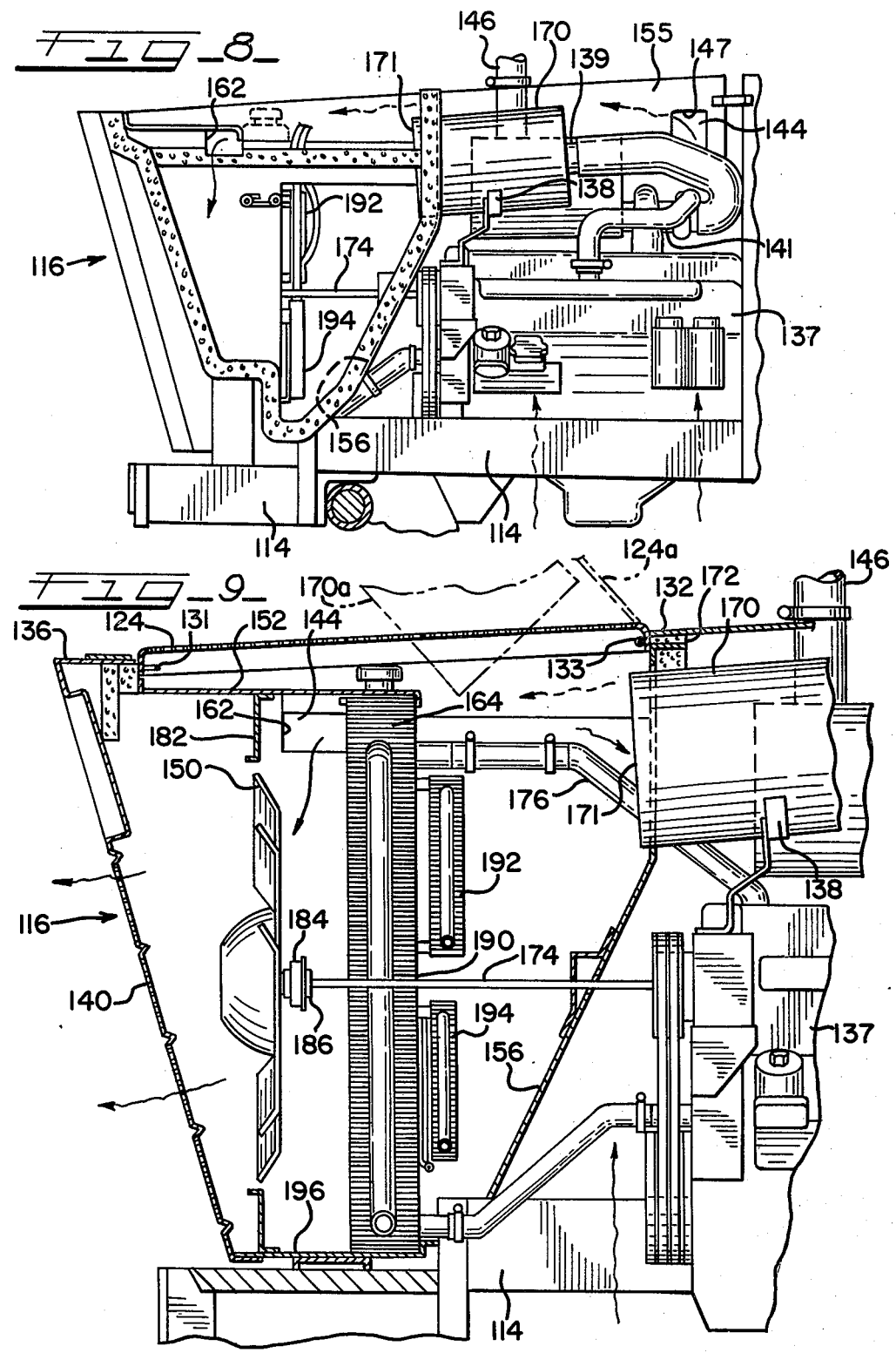

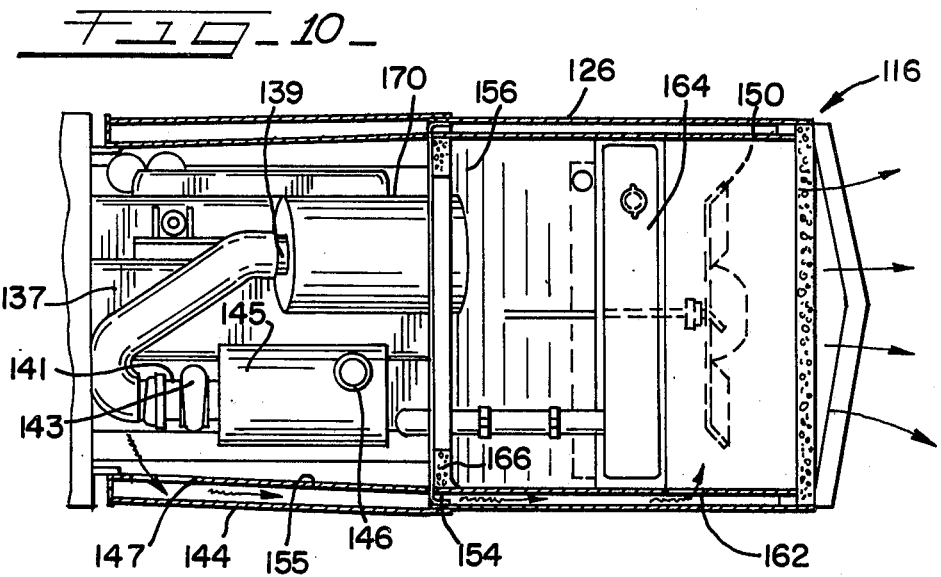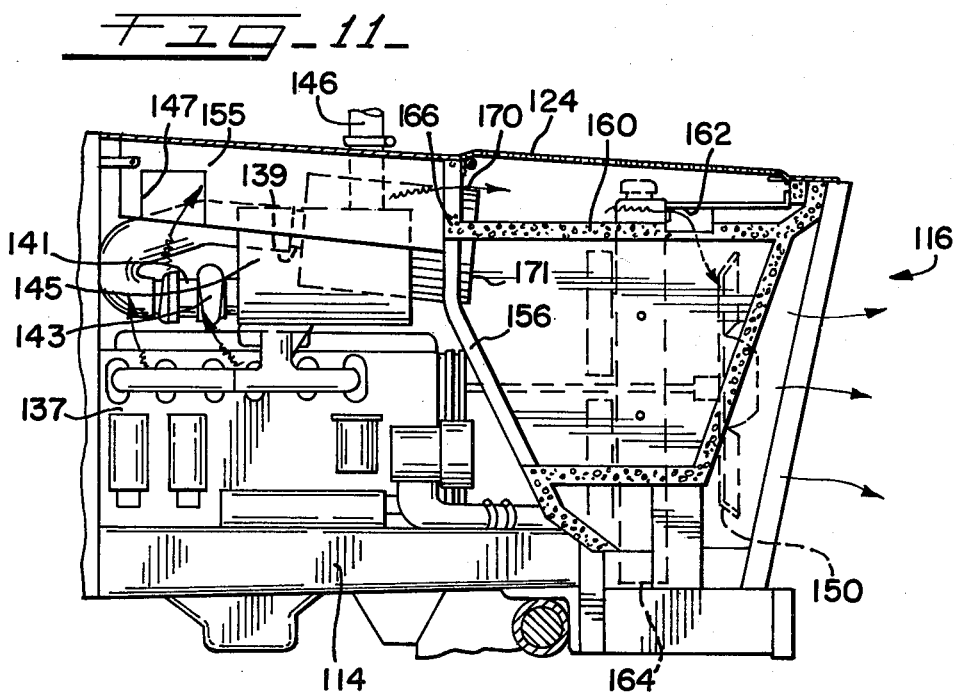

AIR INTAKE ON A TRACTOR ENGINE HOOD

This application is a continuation in part of my now abandoned Ser. No. 355,797 filed Mar. 8, 1982, itself a continuation of my now abandoned Ser. No. 136,869 filed Apr. 2, 1980.

BACKGROUND OF THE INVENTION

1. Field of the Invention

The invention embodies an agricultural tractor improvement. More specifically a cooling system for a tractor is provided with air intake access on top of the hood and an air discharge through the grille area of the tractor. Separate compartments are provided for the engine and for the various heat exchangers of the tractor with an exhaust duct between the engine compartment and the heat exchanger compartment allowing evacuation of the engine compartment through the use of a radiator fan.

2. Description of the Prior Art

Background patents include but are not limited to U.S. Pat. Nos. 4,086,976, 3,946,824, 2,871,968, and particularly 3,043,390.

Current agricultural tractors are all of a similar straightforward design that has been utilized throughout the development of tractors since the early twentieth century. Two-wheel drive tractors are typically front engine machines having long hood structures extending from the operator's zone at the rear of the vehicle to the front grille. The engine, part of the transmission and most auxiliary operating equipment are housed under the hood. In tractors having water cooled engines the engine coolant heat exchanger and an air flow inducing fan are provided near the front of the vehicle. In most cases the front grille is the intake access to provide a flow of cooling air to the various heat exchangers. Some tractor models have side air intake grilles with air flow being directed through heat exchangers back toward the vehicle engine.

In liquid cooled tractors the engine coolant heat exchanger or more commonly, radiator, is connected by hoses to the engine block. The radiator and the engine are separated by an engine driven fan of a suction type that draws a stream of ambient air through the radiator to allow heat transfer from the radiator to the air stream. The ambient air is heated as it is drawn through the radiator and is then directed, by the circumstances of the conventional layout, over the surfaces of the engine where the air flow further assists in cooling localized hot spots on the engine. This heated air eventually flows outwardly from the engine compartment with flow on the left side of the vehicle directed downwardly and flow on the right side of the vehicle directed upwardly. The heated air impinging on the ground surface will raise dust and chaff under usual farming conditions. Excess ground dust and chaff agitation requires frequent cleaning of cab windows, engine radiators and the air cleaner. The tractor operator is also subjected to this blast of hot air, both from the downwardly directed air flow and the upwardly directed air flow, or if the tractor is equipped with a modern day cab, the exterior of the cab is heated by the heated air; this requires air conditioner capacity tht is greater than need be when compared to the instant invention.

The engine noise, including the noise of ancillary equipment such as the cooling fan, is more critical in these times of high horsepower tractors and environmental concerns. The long term exposure to high noise levels leads to undesirable levels of fatigue. The farmer operating his tractor is exposed to these high noise levels for very long periods of time during peak farming seasons when he may work from sunrise to long after sunset preparing his land for seeding and later when harvestring his crop.

In order to minimize the noise levels on tractors it will be necessary to provide baffles around the engine compartment. This development can be seen in the small lawn tractors now being marketed where the usual hood is augmented with side panels extending down to the frame of the vehicle. This solution is feasible with these small tractors as the typically utilize air-cooled engines in small horsepower sizes. They do not generate the tremendous heat load that a large diesel engine farm tractor generates.

If side sheets were added to contemporary farm tractors for noise attenuation a severe localized engine cooling problem would arise. The engine compartment would still receive a blast of heated air from the radiator fan but the air would have to exhaust out the bottom of the engine compartment. This would lead to two difficulties. First, pockets of heated air would be trapped in the engine enclosure preventing the "washing" of the engine block with the desirable cooling flow of air. This would result in probable engine damage due to overheating. Secondly, all the air being drawn through the radiator would have to escape out under the engine compartment and would cause considerable dust and chaff disturbances which are undesirable.

The large tractors require a large volume of air flow through the radiator to ensure adequate cooling. Cooling system capacity becomes sensitive to wind direction when tractors are operated in long fields where the tractor will be operating with a tail wind for long periods of time. Designed in overcapacity is the norm as field operating conditions dictate that the cooling system operate at a given maximum level of efficiency regardless of wind conditions or vehicle velocity. For instance, when the tractor is traveling directly into the wind the air flow through the radiator is augmented by the differential between the speed of the tractor and the wind speed, therefore head winds often enable cooling to be maximized. On the other hand tail winds, as well as cross winds, do not add velocity to the cooling air flow and the tractor's radiator fan must supply all the required air flow. Thus cooling systems must be designed with this tail wind situation as the minimum cooling performance threshold resulting in overcapacity of the cooling system during approximately half of its operating time.

In view of these disadvantages of the prior art a revised cooling air flow configuration is set forth in this disclosure, with primary emphasis directed to the location of the air intake for the heat exchanger compartment in its strategic respects to double walled side sheets which are provided and to the inlet of an engine air cleaner which is provided.

In other words, the stream of intake air from the screen is directed relative to the radiator compartment immediately to supply the air cleaner inlet and the radiator in common with fresh ambient air, but is so baffled as to be effectively bypassed by another stream of air being simultaneously directed from the engine compartment, through the double walls of the side sheets, thence to the downstream side of the radiator. So joinder of the two coexisting air streams, the former radiator-heated and the latter engine-heated, strategically deferred to a point of confluence downstream of the radiator where they merge and are jointly drawn into the fan and blown in common forwardly out the air discharge port at the front grille provided on the tractor.

Among the objects of this invention is the provision of a cooling system design that provides for the enclosure of the tractor engine compartment with full side panels in order that noise generated in the engine compartment can be partially contained and attenuated. This full engine closure will reduce bypass noise. Noise levels in the operator's area will also be reduced due to the side panels and the reverse flow of the cooling air passing out through the front grille away from the operator's station.

Other advantages realized by utilization of this invention include, but are not limited to, an absence of a fan blast on the ground thereby minimizing dust and chaff agitation and minimize collection of chaff on the inlet screen of the radiators.

An advantage of the intake screen location above the heat exchanger compartment is that the screen is self-cleaning primarily after the engine is shut down thus maximizing air flow to the heat exchangers.

Also a significant advantage of having the screen located above the heat exchanger compartment is that the operator is visually aware of abnormal chaff accumulation on the screen.

The invention provides several cooling system advantages including maximization of cooling system effectiveness as a function of wind direction. Also, with the intake screen covered with ice and/or snow there will be no overheating even at full load as the intake screen is designed to flex thus breaking up any ice formation. The design allows a smooth controlled flow of intake and outlet air as the engine block is not interposed in the path of cooling air flow, but in the path of a separate, bypassing air stream.

The intake screen is advantageously larger than would be possible with the conventional front grille intake vehicle where the grille size is constrained by hood width and height. Baffling as taught according to the present principles affords an otherwise unused room for a forward extension of the intake screen so as to greatly multiply the cross sectional intake area available.

These as well as other advantages will be recognized through an understanding of the drawing figures as described herein which disclose certain preferred embodiments of the invention.

SUMMARY OF THE INVENTION

A farm tractor is provided wherein the engine and the cooling system are segregated into individual compartments. The heat exchanger compartment houses the cooling fluid heat exchanger, transmission oil cooler, the air conditioner condenser, the air cleaner inlet and the suction type cooling fan. Air enters the compartment through an access screen located on top of the vehicle's hood and the stream of air is drawn through the various heat exchangers by an engine driven suction fan. The separate engine compartment houses the engine and independently communicates with the same fan by bypassing, with its stream of engine-heated airflow, a goodly portion of the heat exchanger compartment. The fan pushes the now heated double streams of air out through the normal grille area at the front of the vehicle.

BRIEF DESCRIPTION OF THE DRAWING FIGURES

An understanding of the invention and advantages thereof can be appreciated from a consideration of the following description and the accompanying drawings wherein:

FIG. 1 is a side elevational view of the left side of a tractor vehicle incorporating the invention;

FIG. 2 shows a portion of the tractor vehicle in top plan view with the top hood sheet removed for clarity;

FIG. 3 shows a portion of the tractor somewhat similarly to FIG. 1 but with the hood sheet and heat exchanger chamber walls partially sectioned to reveal the radiator fan and associated components;

FIG. 4 is a right front quarter view, and

FIGS. 5, 6, and 7 are respective left side, top plan, and front views of a modification of the invention;

FIGS. 8 and 9 are left side views of the hood of the FIG. 4 modification, to different scales, with differing parts broken away for clarity and with slightly differing partial showings; and FIGS. 10 and 11 are respective top plan and right side elevational views of the hood of the modification, with certain parts removed for clarity.

DETAILED DESCRIPTION OF THE INVENTION

FIG. 1 illustrates a tractor vehicle generally indicated therein at 10 incorporating the instant invention. A cab 12 from wherein the vehicle operator operates the vehicle is supported on a frame 14 as is the engine and heat exchanger compartment of the front portion of the tractor generally 16. The cab is an optional enclosure for the usual operator's station. Large diameter driven wheels, such as 20, and steerable front wheels 22 support the vehicle at all four corners in a well known manner.

Significant items shown in FIG. 1 are the heat exchanger intake screen 24 and the left side sheet or panel 26 completely enclosing the left side of the forward portion of the vehicle. The panel 26 includes a raised portion 30 extending outwardly from the general reference plane of the side panel.

The hood sheet 32 is continuous in length from the cab windshield 34 to the top edge 36 of the front grille 40. The intake screen 24, according to this embodiment, is as wide as the hood sheet 32 and about half the length of the hood. Actually, the screen dimensions are illustrative and could of course be longer or narrower to fit specific installation requirements.

The extent of lateral projection of the raised portion 30 of the left side panel 26, as well as the projection of a similar raised portion 42 in the right side sheet or panel 44, from general reference plane of each panel can be seen in FIG. 2.

In FIGS. 1, 2 and 3, a front end closure appears in its simplest form wherein the engine exhaust pipe, which may extend upwardly through the hood, is not shown. The central front latch and transversely and horizontally aligned rear hinges of the intake screen 24 are altogether omitted from the showings.

The front grille 40 in actual practice is a perforated cover screen that is the exterior surface of a more complex grille louver structure. The grille 40 is perforated to allow the outward passage of air through its perforations without unnecessary impedance. The heat exchanger intake screen 24 can be seen in FIG. 1 as projecting slightly above the reference plane of the hood sheet 32 in this figure.

In FIG. 2, the top view of the front portion of the tractor with the hood sheet removed shows air flow, behind the upper baffle 52 from the engine compartment through the horizontal duct 54 formed in the double walls of the right side sheet 44 comprised of the relatively outer, raised portion 42 of the right side sheet or panel 44 and the continuous, relatively inner side panel 55. Air from the engine compartment is segregated from air being drawn into the heat exchanger compartment, through the top air entry port, by the bulkhead panel 56 and the right side inner side panel 55 and an interior foam seal 60. An elongated aperture 62 in inner panel 55 (see also FIG. 3) provides the access where air from the engine compartment enters the air stream for forced discharge. Notice that the elongated aperture 62, also referred to as an exhaust duct air delivery port 62, is downstream from the radiator 64 but upstream from the fan 50 location such that the engine compartment air bypasses and is deferred from mixing with the cooling air from the heat exchangers until the stream of the later air has passed through the various heat exchangers.

It should be noted that bulkhead panel 56 does not intersect the horizontal duct 54 which, instead, passes by and to the outside of the lateral edge of the bulkhead panel. The foam insulation such as 66 in FIG. 2 is used to seal the outer surfaces of the various baffles and the inner surfaces of the side panels. The foam does not extend along the edge of the bulkhead panel 56 in the area where the double-walled duct 54 passes from the engine compartment to the heat exchanger compartment. However, since this first preferred embodiment includes only an elongated aperture 62 and a functional duct on the right side of the tractor, the left side edge of the bulkhead panel 56 is provided with foam at 58.

FIG. 3 is an enlargement of the front portion of the tractor with some interior panels removed; the hood sheet 32 and the intake screen 24 and various interior baffles are sectioned in this figure. The air cleaner 70 projects through and is sealed to the bulkhead panel 56 which is shown extending from the frame 14 to the hood sheet 32. The air inlet 71 on the projecting portion of the cleaner 70 is interposed in the inducted air stream to draw in the air supply to the cleaner as furnished directly from the screened intake at 24. A foam strip 72 separates the hood sheet 32 from the top edge of the bulkhead panel.

The fan drive shaft 74 and the upper radiator hose 76 also pass through appropriate apertures in the bulkhead panel 56.

The left side interior panel and foam 80 of FIG. 2 have been removed from the showing in FIG. 3 to expose the engine coolant heat exchanger or radiator 64, the fan 50 and the air discharge deflecting slats 68. The heat exchanger mounting location divides the enclosed heat exchanger compartment into an upstream section and a downstream section. A fan shroud 82 encircles the fan 50 to improve efficiency. The fan 50 is supported by a bearing 86 on the front of the fan drive shaft 74 which is in turn supported on a transverse bearing support 86. The radiator 64 is provided with a through aperture 90 to accommodate the fan drive shaft 74.

The described upper baffle 52 extends generally horizontally forwardly and seals the top of the heat exchanger compartment from the front grille to the intake side or upstream side of the radiator, at the rear top edge of the latter.

A transmission oil cooler 92 and an air conditioning condenser 94 can also be provided in the heat exchanger compartment.

The right side interior panel 55 can be seen in FIG. 3. It is similar to the left side interior panel and foam 80 of FIG. 2 but is further provided with the described vertically elongated aperture 62, or exhaust duct air delivery port, for allowing air from the engine compartment to be drawn into the heat exchanger compartment downstream of the radiator 64 by the fan 50 to be exhausted out an open air discharge port defined by the front grille. A bottom panel 96 extends generally from the base of the radiator at its rear to the front grille assembly.

The top intake screen location is very advantageous in several regards. The screen is made of a material having a high percentage of voids such that flow therethrough is relatively unimpeded. Without a screen, flow would be absolutely unimpeded and with a lower percentage of voids flow would be restricted. The screen should allow free flow but prevent the fan from sucking chaff and debris into the heat exchanger compartment. A louver arrangement would typically have openings too large to prevent chaff. Furthermore, ice buildup would more readily occur on a louvered structure and the ice break-up advantage of the screen would not be possible with the louvers. When ice forms on the intake screen 24, it will usually be cracked up and vibrated off the screen when the tractor is started as the screen will be deflected inwardly when air flow through the screen is impeded. Firstly, it is not subjected to normal chaff blocking as it is high enough to be out of the usual area of the crop. A second advantage is the cross winds, tail winds or head winds, naturally occurring or due to the velocity of the tractor will tend to blow off any accumulated chaff that does happen to land on the intake screen.

Another unique aspect of the top intake screen is that it is self-cleaning when the tractor vehicle is shut off. The residual heat of the heat exchangers will tend to radiate upwardly due to convection and will raise various chaff or debris that has accumulated on the screen and cause this material to be waft away from the screen or blown away by the slight ambient breezes blowing across the screen. The top intake screen is exposed to only light chaff such as leaves without stems whereas conventional systems such stemmed leaves of plants are directed onto the front intake screen. The stems then lock the trash onto the screen which then will not fall off. Finally, the highly provident placement of the intake air screen and port in the top of a long hood enables the exaggerated horizontal overhang of the top baffle and substantial extent of the intake screen ahead of the vertical plane of the radiator in the radiator compartment to have especial significance, and further enables the substantial intake screen overhang behind the radiator to have especial significance. The resulting greatly multiplied cross sectional area of the intake screen port materially reduces if not substantially eliminating an undetected plug-up covering the intake screen.

In a physically constructed second embodiment of the invention, several desirable modifications have been realized from a somewhat pivotal change in the horizontal exhaust duct passage formed by the double wall portion of the right side sheet of the hood enclosures. In the following discussion thereof, the reference numerals employed are similar, when applied to similar parts previously described herein and not bearing repeating.

SECOND EMBODIMENT—FIGS. 4–11

The forwardly directed, horizontal exhaust passage 154 (FIGS. 4, 5, 10) is concealed in a double wall portion of the right side sheet 144, located at and parallel to the top edge of such side sheet.

The location and concealment just described afford use of the raised portion of side sheet 144 as a portable side door panel 142 in the hood. The portable panel 142, in the open position illustrated in FIG. 4, exposes an engine compartment access opening 127 which in no way interferes with the passage 154.

Along the rear edge of the opening 127, a pair of breakaway hinges 128 allows the portable panel 142 to be completely removed for certain loader and spray adaptations and another circumstance or two.

At the front edge, the portable panel is secured in place when it covers the opening 127 by a moveable and fixed portion 129 of a front latch.

A similarly located raised side panel 130 is carried by the left side sheet 126 as illustrated in FIGS. 5 and 6.

In FIG. 4, the intake screen port is opened by disconnecting a fixed and moveable portion 131 of a central screen latch and raising the screen 124 rearwardly an upwardly about a piano hinge 133 supporting the rear edge. A prop 135 holds the screen while the operator is attending to the radiator, oil filter, and other portions of the upstream section of the radiator 164 compartment.

ENGINE—FIGS. 10 and 11

The location and concealment of the right side passage 154 has a versatility as seen in these figures of accommodating a desirably highly raised position, with respect to the top side, rear, of an engine turbo super charger 141. Such desirably raised position also allows the raising of an engine air cleaner 170 resting in an upraised cradle 138 (FIGS. 8,9) and having a fixed compressor connection 139 to the compressor of the turbo super charger 141.

Also at the top side of the engine 137 substantially at the rear, an engine muffler 145 and the turbo super charger turbine 143 which exhausts into same are located. The muffler 145 in turn exhausts through a vertical stack 146 leading through the top of the engine hood sheet 132.

The muffler 145 and turbo super charger 141 are above, but substantially transversely aligned with the portable side panel 142 and, in turn, a vent opening 147 in the exhaust duct passage 154 is above but substantially transversely aligned with the door panel and turbo super charger and muffler 145. Because of the openings in the underside of the engine compartment upwardly past the frame 114 and also upwardly in front of the cab, not shown, air washes across the engine 137, is heated to its hottest point in the upper right rear corner of the engine compartment, and immediately vented off by the vent opening 147 and duct passages 154 so that, where the fan intervenes at the exhaust duct air delivery port 162, the port will exhaust the duct passage at a side point between the fan 150 and radiator 164.

ENGINE AIR CLEANER—FIG. 9

The location and concealment of the engine exhaust duct passage, not shown, allows the air cleaner 170 in this figure to be raised because its connections to the turbo super charger are at a higher level as the latter is raised.

Therefore, the air cleaner 170 has its inlet 171 projecting slightly forwardly and downwardly through the bulkhead panel 156 so as to allow rain to run off the casing near the inlet instead of into the inlet 171. The usual cap and clamp inside the inlet 171 which secure a filter element in the casing are not illustrated.

In the propped and raised position which is indicated for the screen 124 by the broken lines 124A, the operator has ready access to the filter element 170A simply by sliding it out of the casing of the cleaner 170 so that it disconnects from the connector 139 and can be removed through the air inlet port.

The air flow exhausting the engine compartment is readily identified by the forwardly directed arrows appearing between the vent opening 147 and air delivery port 162 illustrated in FIGS. 8, 9, 10 and 11.

FIG. 10 brings out the point that the duct passage 154 at the top edge and coplanar with the side sheet 144 is formed by a medially raised box section 155 which not only stiffens the top edge of the side sheet but provides the opposite wall thereto to define the double wall passage 154. The same double wall construction exists in the top edge of the left side sheet 126, but is simply a closed hollow compartment reenforcing the side sheet at the top edge; there is no air flow and no vent opening or air delivery port in the hollow through the double walls.

The two separate streams of radiator heated and engine heated air join between the fan 150 and radiator 164 according to FIG. 10 and are jointly blown by the fan through the remainder of the downstream section of the radiator compartment and forwardly discharged through the grille.

Variations within the spirit and scope of the invention described are equally comprehended by the foregoing description.

What is claimed is:

1. In a tractor having a forward projecting engine compartment at a front portion of said tractor, and a radiator compartment enclosure located in said front portion of said tractor in front of an engine located in said engine compartment, the improvement comprising:
    a front grille opening said enclosure forwardwise and rear bulkhead partition closing it off rearwardwise;
    a vertically disposed radiator carried in the radiator compartment of said radiator compartment enclosure dividing said compartment into an upstream section and a downstream section;
    a top air entry port located on top of said radiator compartment enclosure, said top air entry port providing the air entrance to said upstream section of the radiator compartment;
    first and second hood side sheets common to the engine compartment and to the radiator compartment enclosure, at least the first side sheet having a double wall defining a forwardly directed internal air passage in the top edge of said first side sheet;
    an exhaust duct air delivery port in the side of said air passage in said radiator compartment enclosure;
    a fan so situate in the downstream section that the exhaust duct air delivery port intervenes and exhausts between it and the radiator, for drawing air through said exhaust duct air delivery port and also through said radiator from said top air entry port to said downstream section;

an engine carried turbo supercharger in the engine compartment so situate as to be in closely spaced adjacency to said passage in the first side sheet and to the top rear of the engine at that side; and a vent opening in said passage essentially facing said turbo supercharger for drawing the exhaust air from said engine compartment in close vicinity to the turbo super charger.

2. The invention according to claim 1, further comprising:

an engine carried air cleaner having an inlet end projecting forwardly and downwardly slightly through said bulkhead panel for intersecting air in said upstream section; and a portable side door panel located in said first side sheet below said passage and substantially transversely aligned wih the turbo super charger and vent opening.

3. In a tractor having a forward projecting engine compartment at a front portion of said tractor, and a radiator compartment enclosure located in said front portion of said tractor in front of an engine located in said engine compartment, the improvement comprising:

a front grille opening said enclosure forwardwise and a rear bulkhead partition closing it off rearwardwise;

a vertically disposed radiator carried in the radiator compartment of said radiator compartment enclosure dividing said compartment into an upstream section and a downstream section;

first and second hood side sheets common to the engine compartment and to the radiator compartment enclosure, at least the first side sheet having a double wall defining a forwardly directed internal air passage in the top edge of said first side sheet;

an exhaust duct air delivery port in the side of said air passage in said radiator compartment enclosure;

a fan so situate in a vertical plane in the downstream section that the side port intervenes and exhausts between it and the radiator, for drawing air through the duct incorporated in said side and said side port and also through said radiator from said upstream to said downstream section;

an engine carried turbo supercharger in the engine compartment so situate as to be in closely spaced adjacency to said passage in the first side sheet and to the top rear of the engine at that side;

a vent opening in said passage essentially facing said turbo supercharger for drawing the exhaust air from said engine compartment in close vicinity to the turbo supercharger;

a top baffle extending substantially coextensively with said downstream section, horizontally from the front grille location at the front of said tractor rearwardly to a connection at the top of the radiator essentially in the vertical plane thereof;

a fan shroud in the plane of the fan depending from and secured to an intermediate point in the underside of the top baffle;

a forward facing air discharge port receiving said front grille at the front of said forward portion of said tractor providing air flow egress from said downstream section of the radiator compartment of said radiator compartment enclosure;

a top air entry port located on top of said radiator compartment enclosure so as to overlie said top baffle and downstream section respectively and said upstream section, said top air entry port arranged to provide the sole air entrance to said upstream section of the radiator compartment of said radiator compartment enclosure and partitioned from said downstream section by the top baffle, said top entry port extending horizontally from the front grille location at the front of said tractor rearwardly to a point corresponding to said rear bulkhead partition of the radiator compartment of said radiator compartment enclosure; and an engine air cleaner in said engine compartment protruding at its forwardly facing inlet end slightly through said rear bulkhead partition so as to intervene in the air flow induced by the fan through said top air entry port, across said top baffle, and said radiator, for discharge by said fan out said forward facing air discharge port.

4. The invention of claim 3, further comprising:

an engine connected fan shaft extending forwardly through said rear bulkhead partition, thence coextensively with said upstream section, through the radiator, and coextensive with the downstream section only up to a connection in the vertical plane of the fan and thereto attached thereat.

5. In a tractor vehicle having a forward projecting engine compartment at a front portion of said tractor vehicle, and a heat exchanger compartment enclosure (160,180,152,156,196) located in said front portion of said tractor vehicle in front of an engine located in said engine compartment, and provided with an exhaust duct air delivery port (162) in the side (144) of said enclosure to exhaust engine compartment cooling air, the improvement comprising:

a front grille (140) opening said enclosure forwardwise and a rear partition (156) closing it off rearwardwise;

a vertically disposed engine coolant and oil coolant heat exchanger (164, 192, 194) carried in the heat exchanger compartment of said exchanger compartment enclosure dividing said compartment into an upstream section and a downstream section;

first and second hood side sheet common to the engine compartment and to the heat exchanger compartment enclosure, at least the first side sheet having a double wall defining a forwardly directed internal air passage in the top edge of said first side sheet, said passage being connected with said exhaust duct air delivery port;

a fan (150) so situate in the downstream section that the elongate exhaust duct air delivery port intervenes and exhausts between it and the heat exchanger, for drawing air through said port and also through said heat exchanger from said upstream to said downstream section;

an engine carried turbo supercharger in the engine compartment so situate as to be in closely spaced adjacency to said passage in the first side sheet and to the top rear of the engine at that side;

a vent opening in said passage essentially facing said turbo supercharger for drawing the exhaust air from said engine compartment in close vicinity to the turbo supercharger;

a forward facing air discharge port receiving said front grille at the front of said forward portion of said tractor vehicle providing air flow egress from said downstream section of the heat exchanger compartment of said exchanger compartment enclosure;

a top air entry port located on top of said heat exchanger compartment enclosure above both said upstream and said downstream sections thereof at the front portion of said tractor vehicle, said top air entry port arranged to provide the sole air entrance to said upstream section of the heat exchanger compartment of said exchanger compartment enclosure and arranged with said downstream section partitioned from said top air entry port by an upper baffle (152), said top air entry port extending horizontally from the front grille location at the front of said tractor vehicle rearwardy to point correspondingly to said rear partition of the heat exchanger department of said exchanger compartment enclosure; and a horizontally disposed flexible intake screen (124) coextensive with both the upper baffle partitioning off the downstream section and with the top air entry port, said screen being the outermost surface of said forward projecting engine compartment at said front portion of said tractor vehicle, whereby air flow will be induced by said fan through said horizontally disposed flexible intake screen, across said upper baffle, through said top air entry port and said coolant heat exchanger, and discharged as aforesaid from said downstream section out said forward facing air discharge port.

* * * * *